US011575675B2

(12) United States Patent
Souto et al.

(10) Patent No.: US 11,575,675 B2
(45) Date of Patent: Feb. 7, 2023

(54) INTEGRATED ACTIVITY MANAGEMENT SYSTEM AND METHOD OF USING SAME

(71) Applicants: Esteban Ricardo Souto, Austin, TX (US); John Kenneth Isham, Nashville, TN (US)

(72) Inventors: Esteban Ricardo Souto, Austin, TX (US); John Kenneth Isham, Nashville, TN (US)

( * ) Notice: Subject to any disclaimer, the term of this patent is extended or adjusted under 35 U.S.C. 154(b) by 38 days.

(21) Appl. No.: 17/346,779

(22) Filed: Jun. 14, 2021

(65) Prior Publication Data

US 2021/0306337 A1 Sep. 30, 2021

Related U.S. Application Data

(63) Continuation of application No. 16/401,021, filed on May 1, 2019, now Pat. No. 11,063,947, which is a continuation of application No. 15/573,399, filed as application No. PCT/US2016/030345 on May 2, 2016, now Pat. No. 10,298,583.

(Continued)

(51) Int. Cl.
| | |
|---|---|
| *H04L 29/06* | (2006.01) |
| *H04L 9/40* | (2022.01) |
| *H04W 76/10* | (2018.01) |
| *H04W 4/00* | (2018.01) |
| *H04W 4/02* | (2018.01) |
| *H04W 12/069* | (2021.01) |
| *H04W 12/088* | (2021.01) |
| *G06Q 30/04* | (2012.01) |

(Continued)

(52) U.S. Cl.
CPC ............. *H04L 63/10* (2013.01); *G06Q 30/04* (2013.01); *H04L 63/0428* (2013.01); *H04L 63/06* (2013.01); *H04W 4/00* (2013.01); *H04W 4/023* (2013.01); *H04W 12/04* (2013.01); *H04W 12/069* (2021.01); *H04W 12/088* (2021.01); *H04W 76/10* (2018.02); *H04W 8/005* (2013.01)

(58) Field of Classification Search
None
See application file for complete search history.

(56) References Cited

U.S. PATENT DOCUMENTS

| | | | | |
|---|---|---|---|---|
| 8,175,634 | B2 * | 5/2012 | Sprague ................ | H04M 15/44 455/406 |
| 8,788,655 | B2 * | 7/2014 | Dare ...................... | H04L 67/01 709/224 |

(Continued)

*Primary Examiner* — Maung T Lwin
(74) *Attorney, Agent, or Firm* — Law Office of Jerry Joseph. PLC; Jerry K. Joseph (57) ABSTRACT

A method of providing secure communication between users of a network using layered security, the method includes providing a communicator to each user of a network, each user having user information including user hardware, user software, and user location stored within the network, providing multiple keys to each communicator and corresponding locks to the network, each key including a plurality of identifiers to confirm identity of the user, verifying that a user seeking to obtain access to the network has a communicator with keys that match all the locks stored on the network, and providing the user access to the network when the keys on the communicator are verified, wherein the plurality of identifiers is a combination of user hardware, user software, and user location.

12 Claims, 9 Drawing Sheets

Related U.S. Application Data

(60) Provisional application No. 62/159,881, filed on May 11, 2015.

(51) Int. Cl.
*H04W 12/04* (2021.01)
*H04W 8/00* (2009.01)

(56) References Cited

U.S. PATENT DOCUMENTS

| | | | | |
|---|---|---|---|---|
| 9,529,996 B2* | 12/2016 | Qureshi | ............... | H04W 12/06 |
| 2008/0276179 A1* | 11/2008 | Borenstein | ............. | G06Q 10/10 |
| | | | | 715/736 |
| 2009/0299788 A1* | 12/2009 | Huber | ................... | G06Q 30/02 |
| | | | | 705/26.1 |
| 2011/0225417 A1* | 9/2011 | Maharajh | ............... | G06Q 10/06 |
| | | | | 713/150 |
| 2011/0252240 A1* | 10/2011 | Freedman | ............. | H04W 12/08 |
| | | | | 713/169 |
| 2012/0036245 A1* | 2/2012 | Dare | ................... | H04L 65/1063 |
| | | | | 709/223 |
| 2014/0273965 A1* | 9/2014 | Raleigh | ................ | H04W 12/04 |
| | | | | 455/411 |
| 2016/0012465 A1* | 1/2016 | Sharp | .................. | G06Q 20/321 |
| | | | | 705/14.17 |

* cited by examiner

INTEGRATED ACTIVITY MANAGEMENT SYSTEM AND METHOD OF USING SAME

CROSS-REFERENCE TO RELATED APPLICATIONS

This application claims the benefit of U.S. Provisional Application No. 62/159,881, filed on May 11, 2015, the entire contents of which is hereby incorporated by reference herein.

BACKGROUND

The present disclosure relates to techniques for managing business activities. More particularly, the present disclosure relates to techniques for capturing business activities, such as meetings, communication, and travel, for clients.

Businesses employ workers, such as managers, support staff, etc., to perform various work to generate revenue. Workers are provided with tools, such as production equipment, communication equipment, and office equipment, to perform their work. Communication equipment may include devices, such as phones, email, text, instant message, etc., and associated software to allow workers to communicate with each other, suppliers, clients, etc. Examples are provided in U.S. Pat. No. 3,906,166, the entire contents of which is hereby incorporated by reference herein. Additional examples include the IPHONE® available from APPLE® at www.apple.com.

Office equipment may include devices, such as calendars, maps, clocks, task lists, etc., and associated software. Examples are provided in U.S. Pat. Nos. 8,213,951 and 8,995,955, the entire contents of which are hereby incorporated by reference herein. Additional examples include MICROSOFT OFFICE® and WINDOWS® available from MICROSOFT® at www.microsoft.com.

Security systems may be provided to restrict access to business operations. For example, workers may be provided with restricted access to facilities by using a key card. In another example, access to communication and office equipment, such as cellular phones and/or computers, may be password restricted. Examples of security systems are provided in U.S. Pat. Nos. 8,769,643, 8,788,821, 8,984,282, 9,020,853, and 9,021,578, the entire contents of which are hereby incorporated by reference herein. Additional examples include MICROSOFT OFFICE® and WINDOWS® available from MICROSOFT® at www.microsoft.com, and IPHONE® available from APPLE® at www.apple.com.

Businesses receive payment from customers for products produced from their work or for services provided to their clients. In order to determine pricing for goods and services, businesses calculate fees for material, time, and other resources used to provide such products and services. For example, businesses may account for raw materials, equipment, and workers used in manufacturing a product. In another example, businesses may account for time and other resources used to perform services for a given client. Records of work done, resources used, and time spent may be manually entered into systems and invoices generated. Examples of invoice systems are provided in U.S. Pat. Nos. 7,127,231, 7,634,445, 8,825,537, and 8,929,858, the entire contents of which are hereby incorporated by reference herein. Additional examples include QUICKBOOKS® available from INTUIT® at www.quickbooks.intuit.com and ELITE® available from THOMSON REUTERS® at www.elite.com.

SUMMARY

In at least one aspect, the disclosure relates to an integrated activity management system for a firm comprising at least one user. The system includes at least one communicator, at least one firm unit, a firm network, and an administrator. The communicator includes a user input, a user application, communicator identification, user memory, and a local processor. The user input receives input data from the one user, and the input data includes client information and rate information. The user application performs at least one firm activity, and the application includes a communication application and a clock application. The communicator identification includes a unique carrier identification and a SIM card. The user memory includes a client database to store the input client information and time spent on the firm activity, a rate database to store the input rate information, and a phone database to store the communicator identification. The local processor to generate a log of the time spent on the firm activity. The firm unit includes a clone memory including a clone of the user memory, a firm memory comprising a case mapping database to receive and store structure of the firm, a rate database to store client rates, and a contacts database to store contact information, and a firm processor to determine client billing based on the cloned user information and firm information stored in the firm memory. The administrator coupled to the firm unit to selectively grant access to the firm network to the communicator and the firm unit whereby secured communication between the communicator and the firm unit is provided.

In another aspect, the disclosure relates to an integrated method for communicating with a firm having at least one user. The method involves establishing a communication link between users of the firm via a firm network. The users include at least one user and at least one firm unit. Each of the users has a communicator with unique communicator identification, a user memory, and at least one user application. The method further involves inputting user information comprising client information and rate information to the communicator, storing the input client information to a client database, the input rate information to a rate database, and the communicator identification in a phone database of the user memory, performing firm activities using user application of the communicator, capturing time spent on the firm activities using the user application, cloning the user memory to the firm unit, inputting firm information comprising firm structure, the rate information, and contact information into a firm memory of the firm unit, and generating reports based on the user information, the firm information, and the captured firm activities.

In another aspect, the disclosure relates to an integrated activity management system for a firm comprising at least one user. The system includes a firm network, at least one communicator, a detector, at least one firm unit, an administrator, and multi-layered security. The communicator includes an input to receive input data from the user, communicator identification, a user memory, and a local processor. The communicator identification includes a unique carrier identification and a SIM card. The user memory receives and stores user information including identification information from the communicator identification. The detector wirelessly couples to the communicator to wirelessly detect the communicator identification and to determine location information of the communicator identification. The firm unit is in selective communication with the communicator via the firm network. The firm unit includes a clone memory including a clone of the user memory, and a firm memory to receive and store firm information. The administrator is coupled to the firm unit to selectively grant access to the firm network to the firm unit. The multi-layered security includes multiple access locks of the firm unit corresponding to multiple access keys of the communicator. The access keys include the communicator identification and the location. The access locks include expected communicator identification. The firm unit includes a security processor to determine if a match exists between the access keys and the access locks whereby access to the firm network is selectively provided to selectively permit communication between the communicator and the firm network.

In yet another aspect, the disclosure relates to an integrated method for communicating with a firm having at least one user. The method involves registering the user with a firm unit by defining at least one access lock, determining a location of the communicator by detecting the communicator identification with at least one detector, providing the user with a communicator having at least one access key corresponding to the access lock (the access key includes at least one unique communicator identification and the location, and the communicator identification includes a unique carrier identification and a SIM card), providing the user with access to a firm network by comparing the access key to the access locks and, upon confirming a match, opening a communication link between the user and the firm network, and communicating with at least one other user via the firm network.

Finally, in another aspect, the disclosure relates to an integrated method for face to face meeting at a firm. The method involves receiving a meeting request from a host via a host communicator, detecting a location of user communicators and the host communicator with a detector, identifying the user communicators within a maximum radius of the host communicator based on the detected locations, sending invitations to and receiving responses from the user communicators, at least one of the responses comprising an acceptance, and joining the users with the acceptance and the host in the meeting by establishing a communication link between the host communicator and the user communicators via a firm network.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

DETAILED DESCRIPTION

The description that follows includes exemplary systems, apparatuses, methods, and instruction sequences that embody techniques of the subject matter herein. However, it is understood that the described embodiments may be practiced without these specific details.

The disclosure relates to an integrated activity management system. The system integrates user activities (e.g., meetings, calls, messages, emails, etc.) performed by workers at a firm with the client information (e.g., matter nos., rates, etc.) in real time to continuously capture such activities and automatically generate outputs (e.g., reports, invoices, etc.) The activity-driven system integrates user equipment with client information for automatic invoicing. Unlike existing systems which require repeated manual entry of tasks performed and time worked for each client, the integrated system is an activity-driven system configured to allow users to automatically capture activities performed for clients. The assigned activities may be continuously collected for invoicing and/or reporting.

The system provides a multi-layered, multi-functional, and flexible system that allows for adjustment to any configuration (e.g., number of workers, managers, firms, etc.) The integrated system includes a vertically and horizontally expandable structure with users at administrator, firm, manager, and/or worker levels as needed. The levels are linked to a firm network for passing communication therethrough. Communications may be passed via the firm network to other users using various communicators, such as phones, tablets, computers, or other devices.

The firm network provides a secure means for providing communication with users of the firm. Multi-layered security is provided to establish secure communication links between users and the firm network. Unlike existing systems that may restrict access with passwords or card keys, the multi-layered security uses multiple identification locks and corresponding keys relating to user hardware (e.g., SIM card, carrier ID, and phone ID), software (e.g., passwords), location (e.g., coordinates, distance from base, etc.), and other user information. The user information is kept by a system administrator which governs the locks and verifies that users seeking to obtain access to the firm network have keys that correspond to the locks. Once a match is confirmed, a user may access the firm network and securely communicate with other users.

Once accessed, user activities performed using computer equipment may be continuously captured and correlated to client information so that invoices may automatically be generated. This enables real time capture of user activities, such as existing activities (e.g., GPS, clock, phone, email, calendar, task, and text functions) and new activities (e.g., face to face meeting and dashboard), performed for each client. While manual time entry of work performed for clients is possible, user activities may be captured without requiring time entry so that invoices may be generated at any level of the firm at any time. This automatic and integrated capture via secured communication links may be used for the intended purpose of increasing accuracy, increasing capture of time worked, reducing time consuming and tedious time entry, increasing security, leveraging existing communication systems, among others.

Integrated System Structure

Figure 1:
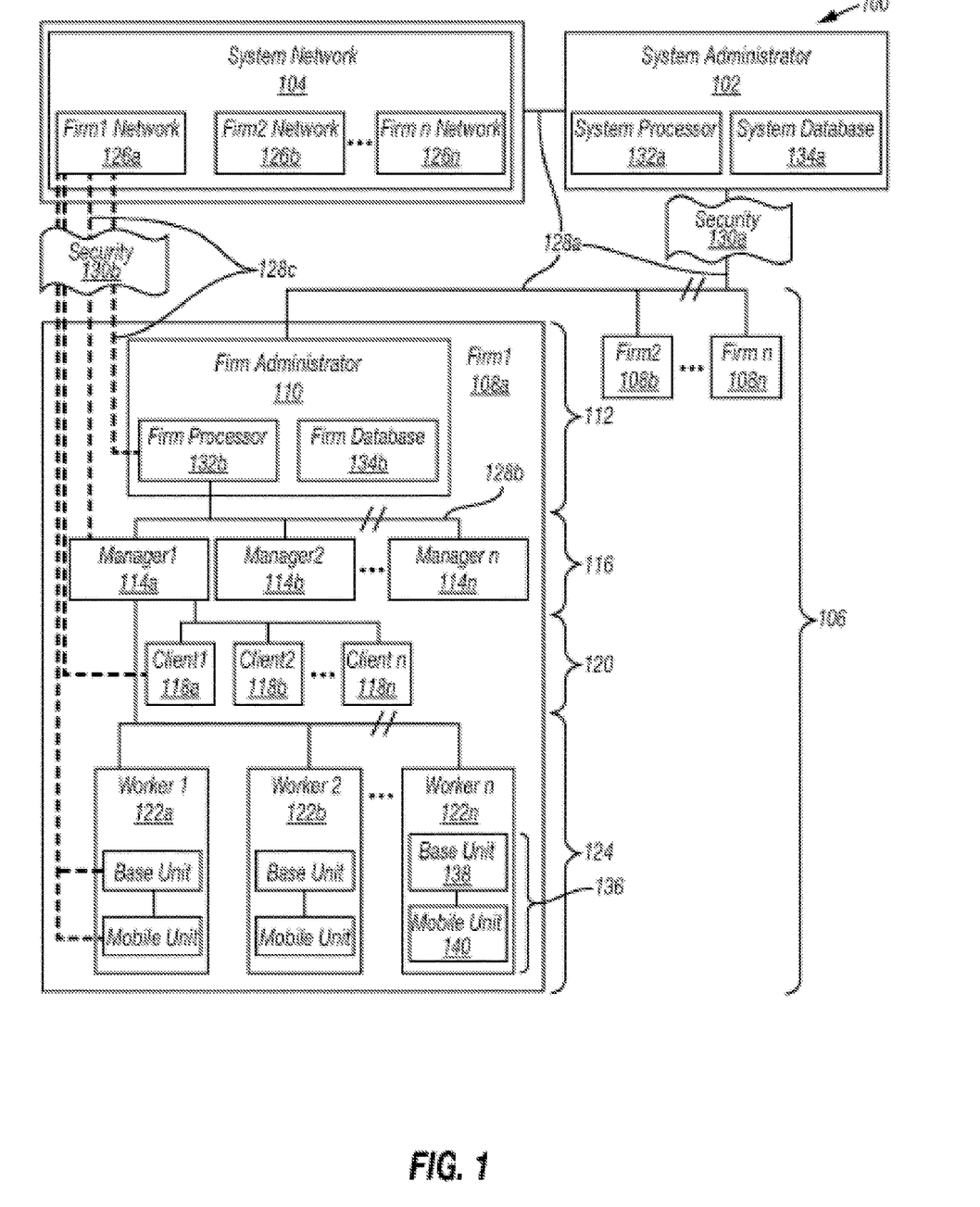
FIG. 1 is a schematic diagram depicting an integrated activity management system.
Figure 2:
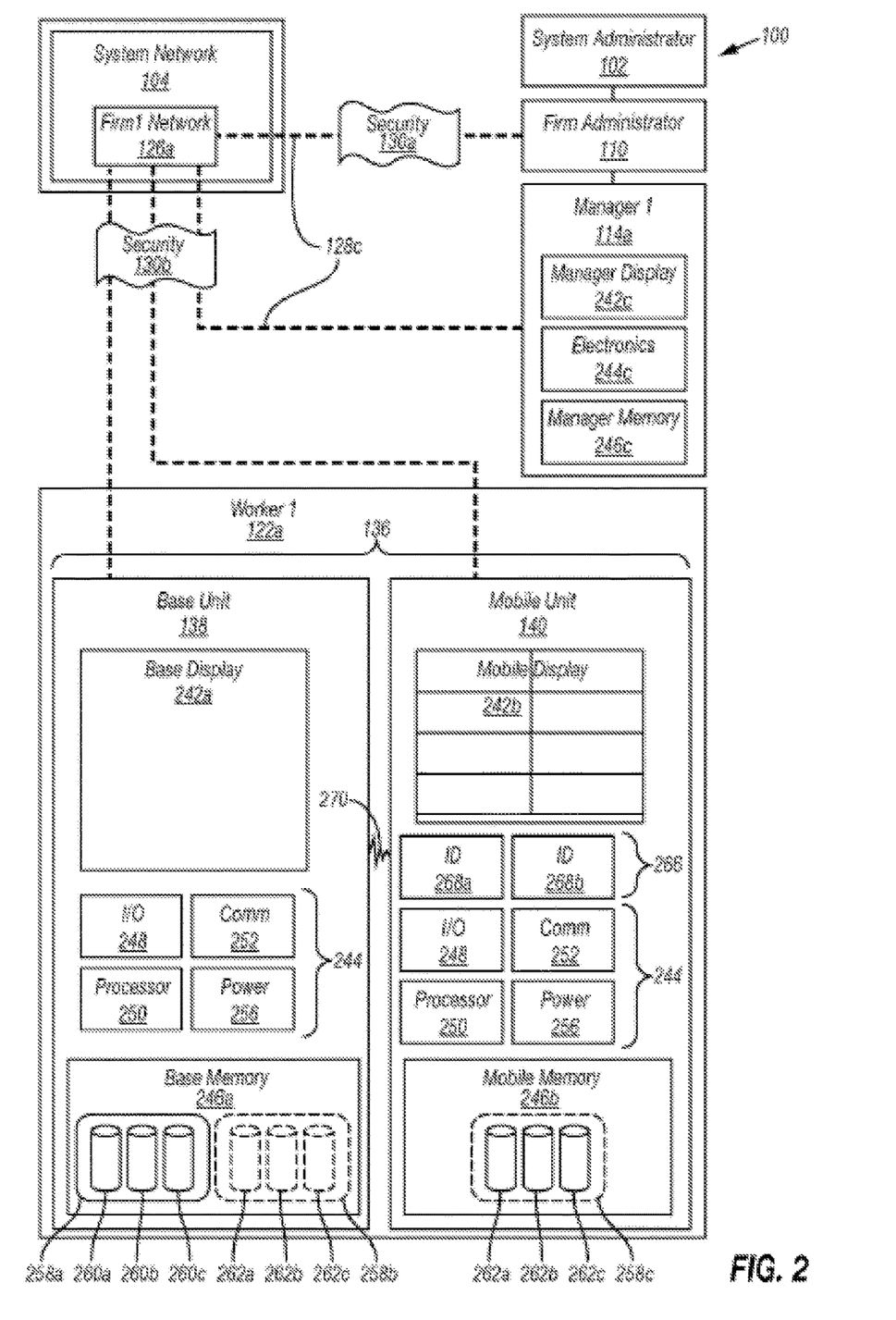
FIG. 2 is a schematic diagram of the integrated activity management system depicting a worker in greater detail.

FIGS. 1 and 2 are schematic diagrams depicting the integrated activity and invoicing system 100. The integrated system 100 includes a system administrator 102, a system network 104, and various users 106. The users 106 may include one or more firms 108a-n linked to the system administrator 102. Each firm 108a-n includes a firm administrator 110 at a firm level 112, one or more managers 114a-n at a management level 116, one or more clients 118a-n at a client level 120, and/or one or more workers 122a-n at a worker level 124.

This integrated system structure provides an adjustable configuration. As indicated by the ellipses, the integrated system is flexible to provide for the addition of users at each of the various levels 112, 116, 120, 124 and/or the addition of new levels. In this manner, a flexible hierarchy of users may be created. While a two-dimensional (2D) hierarchy is shown, the hierarchy may be a three dimensional (3D) hierarchy supported by the system administrator 102 and the system network 104. Additionally, the system network 104 may be a single system network at a single location as shown, or may include one or more system networks at various locations. Within the system network 104, one or more firm networks 126a-n may be provided, each accessible by assigned firms. Each firm 108a-n may have one or more firm networks 126a-n for use by users within the firm.

The system administrator 102 operates the system network 104. The system network 104 may be, for example, one or more servers, or other device(s) capable of exchanging information from the various users 106. The system administrator 102 may include one or more databases, processors (e.g., central processing units (CPUs)), and other hardware and associated software for operating the system network 104.

The system administrator 102 may be linked by access links 128a to the system network 104 and the firms 108a-n. The access links 128a extend between the system administrator 102 and the users 106 as indicated by the solid lines. Such access links 128a may be wired communication links (e.g., Ethernet, cable, etc.) and/or wireless communication links (e.g., Bluetooth, wifi, antenna, satellite signal, etc.) used to provide communication between the firms 108a-n and the system administrator 102. The access links 128a may be used, for example, to selectively grant the firms 108a-n access to the system and/or firm networks 126a-n. As shown, security 130a may be provided to allow identification of the firms 108a-n by the system administrator 102 as is described further herein.

The system administrator 102 may include hardware, such as computers, communicators, databases and/or processors, and associated software for managing the system 100. The system administrator 102 may be operated by one or more persons that manage the system network 104 and control access requirements for obtaining access to the firm networks 126a-n. In the example shown in FIG. 1, the system administrator 102 includes a system processor 132a, a system (or access) database 134a and associated hardware and software for communicating with the system network 104 and the firms 108a-n. Such features may be used for identifying users 106 and granting user access to select firm networks 126a-n.

The access database 134a may include information about the firms 108a-n used to identify the firms 108a-n. Various criteria and/or security may be provided to identify the firms 108a-n and to provide select access to select portions of the system network 104 based on such identification as is described further herein. The processor 132a may be used to identify the firm(s) 108a-n, for example, by matching firm information from the access database 134a to the firm information available from the firm administrator 110 and/or users 106. Based on the matching, the processor 132a may then establish access via communication links 128c to one or more of the firm networks 126a-n in the system network 104.

Once access is granted to the firm administrator 110, the firm administrator 110 may then provide similar access to users 106, such as managers 114a-n and workers 122a-n, within the firm 108a. Like the system administrator 102, the firm administrator 108a may be used to define access to the firm database 126b for the users 106 within the firm 108a. The firm database 134b may also have information that identifies the firm 108a and/or the users 106 to the system administrator 102.

Like the access database 134a of the system administrator 102, the firm database 134b may include information to identify the firm users. Various criteria and/or security may be provided to identify the users and to provide select access to select the firm network 126a based on such identification as is described further herein. The firm processor 132b may be used to identify the users 106, for example, by matching firm information from the firm database 134b to the firm information available from the system administrator 102, the firm administrator 110 and/or the users 106. Based on the matching, the processor 132b may then establish access via communication links 128c to the firm networks 126a in the system network 104.

Also, like the system administrator 102, the firm administrator 110 may have a firm processor 132b and firm database 134b linked by access links 128b to the users 106. The access links 128b extend between the firm administrator 110 and/the users 106 as indicated by the solid lines. As shown, the access links 128b extend sequentially through the levels 112, 116, 120, and 124 of the firm, but could also be direct from the firm administrator 110 to any firm user.

Once users within the firm 108a are registered by the firm administrator 110 and identified by the system administrator 102, users are provided access via communication links 128c to the firm network 126a. Various levels of access and/or portions of the firm network 126a may be selectively provided to the users within the firm 108a. For example, managers 114a-n may be provided with different (e.g., additional) privileges from privileges of clients 118a-n and/or workers 122a-n for accessing functions and/or information via the firm network 126a. Levels of access may be determined, for example, by levels 116, 120, 124 within the firm 108a and/or by identification of specific users. Identification may be provided using additional security as is described further herein.

The communication links 128c between the users 106 and the firm network 126a are defined to provide a secured communication link via the firm network 126a between the users 106 as indicated by the dotted lines. Security 130b is provided along the secured communication links 128c for all communications passing between users accessing the firm network 126a. Security 130b may include, for example, encryption of all communications in any form (e.g., verbal, written, video, etc.) and secured access to the firm network 126*a* as is described further herein.

The users 106 accessing the firm network 126*a* may perform individual and/or collective activities that are passed through the firm network 126*a* to other users 106 for performing additional activities. Each of the users 106 in the firm 108*a* may be provided with hardware, such as databases, processors (e.g., central processing units (CPUs)), and associated software for performing various activities as are described further herein. The users in the firm 108*a* may also be provided with one or more communicators 136, such as computers, tablets, mobile phones, etc., capable of fixed and/or mobile communication with the firm network 126*a*. Such communicators 136 may also be used for other purposes other than activities and/or functions used in connection with the system 100.

In the example shown in FIG. 1, the workers 122*a-n* are provided with communicators 136 in the form of a base unit 138 and a mobile unit 140. The base unit 138 may be, for example, a desktop computer located at firm facilities (e.g., at an office for workers 122*a-n*). The mobile unit 140 may be, for example, a mobile phone (or tablet), carried by the workers 122*a-n*. While not specifically shown, the firm administrator 110, the managers 114*a-n*, and clients 118*a-n* may also be provided with communicators 136, such as those shown for the workers 128*a-n*.

FIG. 2 shows another view of the integrated system 100 depicting the manager 114*a* and worker 122*a* in greater detail. This view shows the interaction of the worker's communicators 136 with the firm network 126*a*. As shown in this view, the worker has two communicators 136, namely base unit 138 and mobile unit 140. The base unit 138 in this example is a computer with a base display 242*a* (e.g., monitor), electronics 244, and base memory 246*a*. The electronics 244 may be conventional electronics, such as an input/output (e.g., keyboard, mouse, microphone, monitor, etc.) 248, processor 250, base communicator 252, power 256, and/or other hardware, used with a conventional computer.

The memory 246*a* may house a base database 258*a* and activity database 258*b*. The base database 258*a* as shown includes a rate database 260*a*, a case mapping database 260*b*, and a contacts database 260*c*. The rate database 260*a* may include rate information, such as worker hourly rates for given tasks and/or given workers. The mapping database 260*b* may include information about firm hierarchy and worker position within the hierarchy. The contacts database 260*c* may include information about the client, such as unique address, phone number, etc.

The activity databases 258*b* as shown includes a client database 262*a*, a rate database 262*b*, and a communicator database 262*c*. The client database 262*a* may include client information and/or identification, such as client matter numbers and/or names. The rate database 262*b* may include rate information, such as worker hourly rates for given tasks and/or given workers. The communicator database 262*c* may include information about the communicator 136, such as unique hardware identifiers (e.g., SIM card, carrier ID, and phone ID), serial numbers, etc.

The mobile unit 140 is similar to the base database 258*a*, except with a different mobile display 242*b* tailored for handheld use by the worker 122*a* as is described further herein. As also indicated, the mobile unit 140 includes mobile memory 246*b*. The mobile memory 246*b* may include a mobile databases 258*c* including the same databases 262*a-c* as in the base memory 246*a*. Additional databases are not shown, but may also be provided. As indicated by the dashed line for databases 262*a-c* in the base memory 246*a*, the databases 262*a-c* may be cloned from the mobile memory 246*b* (or vice versa).

As indicated by the wavy line, the base database 258*a* may be linked to the mobile database 258*c* by synchronization link 270 for communication therewith. The synchronization link 270 may enable synchronization between the base unit 138 and the mobile unit 140 to maintain consistency between the base databases 258*a,b* and the mobile database 258 such that databases 262*a-c* maintain the same information. Optionally, information may be captured by the base unit 138 and/or mobile unit 140 for inclusion in the databases 262*a-c*.

The mobile unit 140 is also provided with identification 266 that uniquely identify the mobile unit 140. In the example of FIG. 2, the identification 266 are shown to include an identification module (e.g., a subscriber identification module or SIM card issued to mobile phone users by a mobile phone carrier (e.g., AT&T®, VERIZON®, etc.)) 268*a* and carrier identification (e.g., a mobile identification number (MIN) assigned by a mobile carrier (e.g., AT&T® or VERIZON®) or mobile subscription identification number (SMIN) assigned to the mobile phone by phone manufacturers (e.g., APPLE®, SAMSUNG®, etc.)) 268*b* that may be used to identify the mobile unit 140 as is described further herein. Information about the identification 266 may be kept in communicator database 262*c*.

While a specific configuration is depicted, it will be appreciated that the configuration may vary. For example, the worker 122*a* may have either a base unit 138 or a mobile unit 140, or both. In another example, the manager 114*a* may be provided with a display 242*c* and electronics 244*c* similar to those of the communicators 136. The manager memory 246*c* may be the same as the base memory 246*a* and/or the mobile memory 246*b*, and/or be provided with additional databases, such as a manager database with firm information. Various combinations of one or more of the communicators 136 and/or features may be provided in one or more users.

The users 106 may use the same communicators 136 to perform various activities (e.g., making phone calls, sending emails, etc.), to input data into their databases 262*a-c* concerning their work, and to exchange information with other users via the firm network 126*a*. Information sent to/from the firm network 126*a* is encrypted and passed via the secured communication links 128*c* through the firm network 126*a* to other users to allow an exchange of information from the respective databases 262*a-c* (and/or other databases, such as 260*a-c*) of multiple users.

The integrated system employs existing communicators to capture activities performed by the worker and to pass information in real time to the firm network using a multi-layered security system. In this configuration, the integrated system provides: 1) a real time communication system to establish communication between users and the firm network, 2) continuous capture of activities performed by the worker and access to such captured activities throughout the firm, and 3) a multi-layered security system for user access and communications.

Communication

Figure 3:
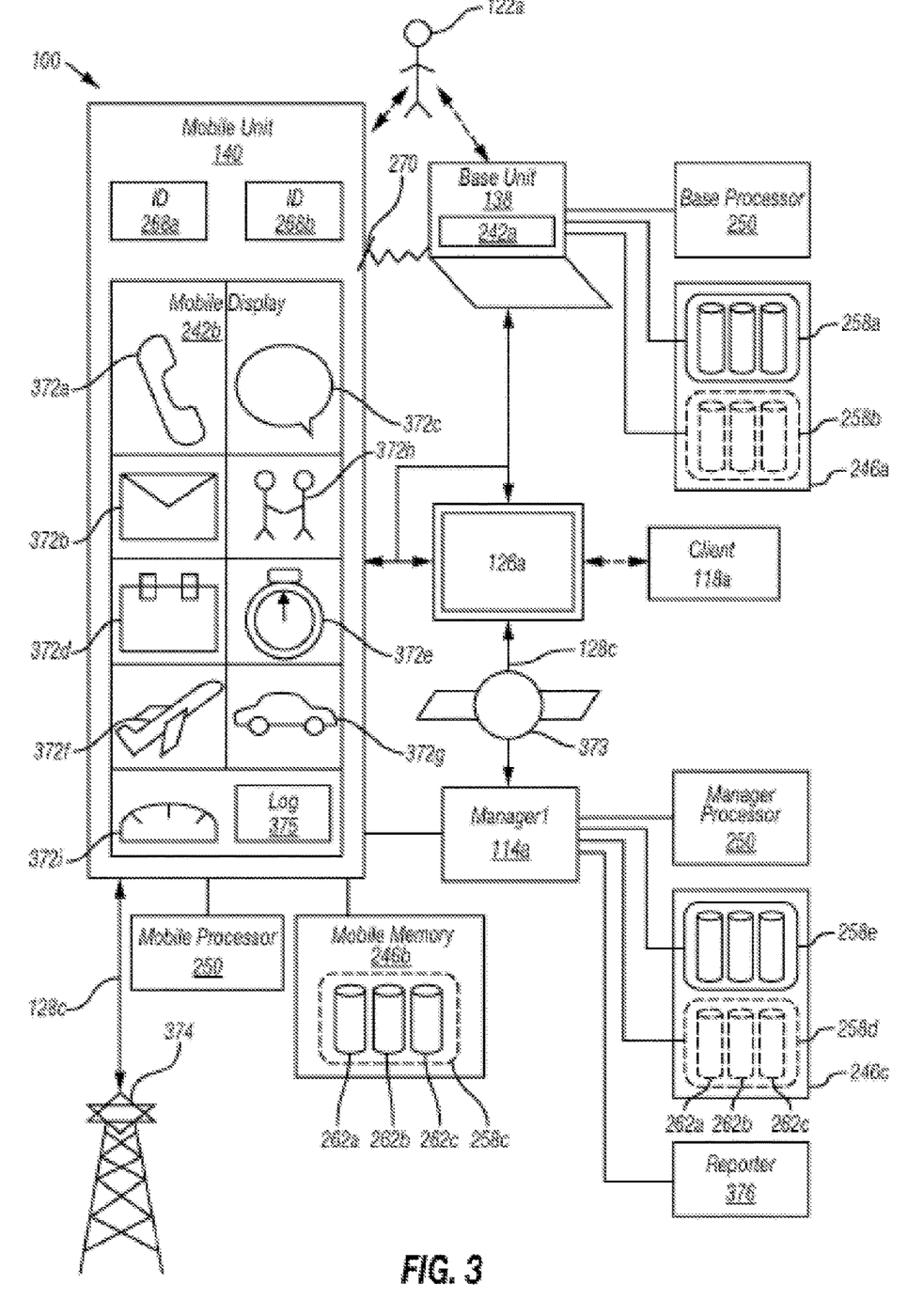
FIG. 3 is a schematic diagram of the integrated activity management system depicting the mobile unit in greater detail.

FIG. 3 is a schematic diagram depicting communication using the integrated system 100. As shown in this view, a worker 122*a* is in communication with the base unit 138 and/or the mobile unit 140 as indicated by the dashed arrows. The worker 122*a* may communicate via an input/output device (e.g., 248 of FIG. 2) of the base unit 138 and/or mobile unit 140. The worker 122a may input information, such as the client and rate information, over time for entry into the databases 262a,b, respectively, of the mobile unit 140 and/or base unit 138.

The display 242b of the mobile unit 140 provides a graphical unit interface (GUI) with screens 372a-i relating to activities that may be performed by the worker 122a. The screens 372a-i enable the worker 122a to interact with the mobile unit 140 to perform such activities. As shown, the screens 372a-g include a phone screen 372a, an email screen 372b, a text screen 372c, a calendar screen 372d, a clock screen 372e, a travel screen 372f, and a mileage screen 372g that may employ conventional phone, email, text, calendar, clock, travel and mileage applications, respectively, used to perform corresponding activities. Examples of mobile applications that may be used are available at www.apple.com.

The display 242b may also be provided with additional screens 372h-i, such as a unique meeting screen 372h for performing unique activities, such as 'face to face' meetings, and a unique dashboard screen 372i for inputting client information and displaying a log of client activities. The meeting screen 372h provides users with face to face meeting capabilities as is described further herein. The dashboard 372i provides for inputs and outputs associated with the activities performed on behalf of client 118a by worker 122a using the mobile unit 140.

The worker 122a and/or other users 106 may input information, such as the client, rate, firm hierarchy, and/or other information, to the base unit 138. The worker 122a may input such information using the dashboard 372i. Such input information may be stored, for example, in databases 260a-c in the base memory 246a (see, e.g., FIG. 2). Information from the mobile unit 140 may also be provided to the base unit 138 by synchronization via communication link 270 with the mobile unit 140.

The mobile unit 140 may receive input from the worker 122a and/or other sources. For example, the mobile unit 140 may also be in communication with a cellular tower 374 via a communication link 128c either directly as indicated by the dotted line, or indirectly via the firm network 126a. The cellular tower 374 may detect and identify the SIM card 268a in mobile unit 140. The cellular tower 374 may be used to detect a position of the SIM card 268a using conventional global positioning satellite (GPS) technology.

The cellular tower 374 may receive information, such as the detected identification, position, and/or other information, to the mobile unit 140. The detected information may be communicated to the mobile unit 140 by the cellular tower and stored in the communicator database 262c of the mobile unit 140. Information about the mobile unit 140, such as the carrier identification 268, may also be received from the mobile unit 140 and/or other sources and stored in the communicator database 262c. Information in the communicator database 262c may be used to identify the mobile unit 140 as is described further herein.

As previously described with respect to FIG. 1, the worker 122a may communicate via the firm network 126a through the communication links 128c with other users 106, such as the manager 114a and the client 118a. As further shown in FIG. 3, the worker 122a may be in communication with the firm network 126a via the base unit 138 and/or the mobile unit 140. FIG. 3 also shows that the communication link 128c may be made with the network 126a via a satellite 373 as indicated by communication link 128c between the manager 114a and the firm network 126a. Information, such as information received by the base unit 138 and/or the mobile unit 140, may be passed via the firm network 126a between the various users 106 (e.g., the manager 114a, the client 118a, and/or the worker(s) 112a).

As indicated by the dual dotted arrows, the communication links 128c may be used to pass information between the users 106. Information input by the manager 114a and client 118a may be received via the firm network 126a in the databases 262a,b. Activities performed by the worker 122a using the screens 372a-i may be captured, for example, using clock 372e to detect the time spent performing the activities. The time spent may be recorded and stored, for example, in the client database 262a. Information may be captured directly in the mobile unit 140 and/or the base unit 138, and/or passed to the base unit 138 and/or manager 114a from the mobile unit 140.

Communications may also pass between the worker 122a and the client 118a via the firm network 126a, the base unit 138, and/or the mobile unit 140. Communications may also pass between the manager 114a and the client 118a via the firm network 126a. The various users 106 may have selected ability to add and/or modify information stored in the various databases. For example, managers 114a may have the ability to modify worker inputs, and clients 118a may be restricted from accessing such information.

Information gathered in the databases 262a-c in the mobile unit 140 may be processed locally in the mobile processor 250 and stored locally in mobile memory 246b. The mobile unit 140 may capture information concerning the worker's time spent performing a given activity. Input information and/or captured activity may be associated with a specific client by processor 250. The processed local information may be used, for example, to generate the log 375. The log 375 may display information, such as time spent on activities associated with a given client. This information may be displayed using the dashboard screen 372i.

The local information may be passed via the firm network 126a to other parts of the system 100 via the communication links 128c for remote processing and/or storage. The information may be cloned from the mobile database 258c in the mobile memory 246b of the mobile unit 140 to the database 258b in the base memory 246a in the base unit 138. Remote processing of information may be performed, for example, using the processor 250 in the base unit 138 and/or other units (e.g., the manager and/or firm).

As further shown in FIG. 3, the manager 114a may also be provided with a processor 250 and/or memory 258d with databases 262a-c. Like the base unit 138, the manager 114a may receive, store, and/or clone information in the databases 246a-c of the mobile unit 140 and/or the base unit 138. The manager 114a may optionally provide additional information to an additional database 258e. Processor 250 in the manager 114a may combine part or all of the information in one or more of the databases. For example, the processor 250 may collect information about activities performed by the worker 122a, such as time spent and tasks performed, and determine based on assigned rates amounts to be invoiced. The manager 114a may be provided with a reporter 376 to generate reports, such as invoices, from the processed information. The manager 114a may optionally modify the reports.

Example—User Activity Capture

Figure 4:
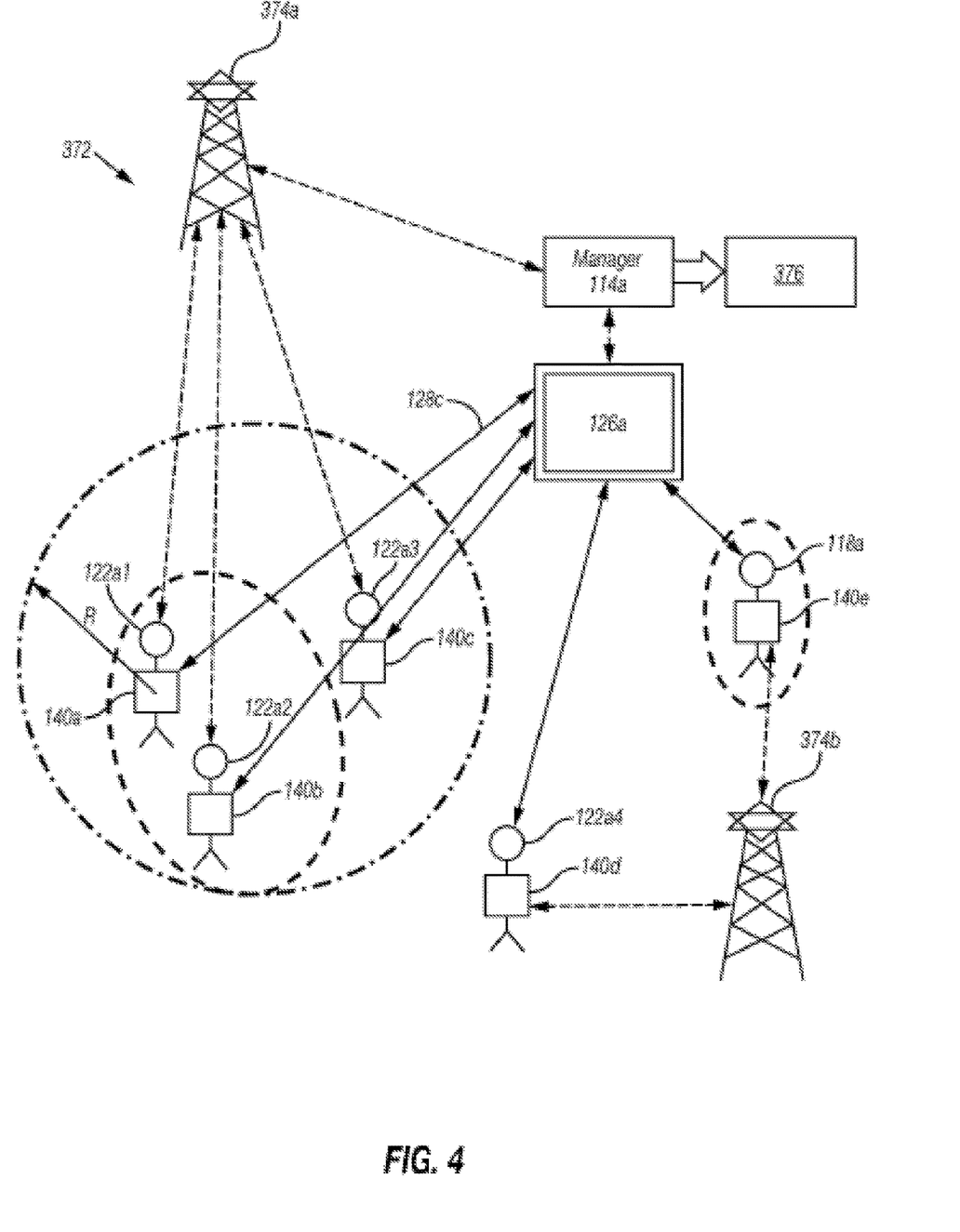
FIG. 4 is a schematic diagram of the integrated activity management system during a face to face meeting.

FIG. 4 is a schematic diagram depicting an example activity 372 performed using the integrated system. FIG. 4 shows the face to face meeting activity involving a meeting between multiple workers 122a1-a3. A face to face meeting may be initiated by a user, such as worker 112a1. This user is designated as a host for the meeting. Other users 112a2,a3 within a radius R of the host 122*a*1 are identified and presented to the host for selection.

Users may be identified using a location procedure to detect user locations. As shown in this view, the cellular towers 374*a,b* may be used to detect the mobile unit(s) 140*a-e* within range thereof. The cellular tower 374*a* has three workers 122*a*1-*a*3 within Range for detection thereof. The cellular tower 374*b* has one worker 122*a*4 and client 118*a* within range for detection thereof. The cellular towers 374*a,b* may detect the mobile units 140*a-d* of each of the users 122*a*1-*a*4, respectively.

As described with respect to FIG. 3, the cellular towers 374*a,b* are able to identify the SIM cards 268*a* of each of the mobile units 140*a-d* and detect the location thereof. The information detected by the cellular towers 374*a,b* may be stored in the memory 246*b* of the mobile units 140*a-e* and then passed to the manager 114*a*, and/or passed directly from the mobile units 140*a-d* to the manager 114*a*, via the firm network 126*a*.

Location of the mobile units 140*a-d* may also be determined by detecting the mobile units using conventional connection devices, such as blue tooth, wifi, or other connectors. The mobile units 140*a-d* may be provided with such conventional wireless connectors in communication with corresponding connectors in the manager 114*a* (and/or the firm administrator 110, and/or the system administrator 102 (FIG. 1)).

Upon detection of workers, the manager 114*a* may receive information about the workers 122*a*1-*a*4 via the firm network 126*a*. The information may be received from the mobile units 140*a-d* using the connectors, or information received from the cellular tower 374*a*. The information may include, for example, GPS coordinates, identification 266 (e.g., carrier ID 268*b* and/or SIM card ID 268*b*) for each of the mobile units 140*a-e*, etc. (FIGS. 2-3). Such information may be processed locally and/or remotely (e.g., at the manager 114*a*). This information may be used to detect and/or identify the workers 122*a*1-*a*4, determine locations, and/or determine distances D1-D3 between the workers 122*a*1-*a*4. Workers within a range (e.g., a selected radius R of the host) may be in a potential meeting situation.

In the example shown in FIG. 4, the host may be queried whether to include the nearby workers within the host radius R. The host 122*a*1 has selected user 122*a*2 to join the meeting, and user 122*a*3 has not been joined. Optionally, the host may be permitted to invite users outside the host range R or undetected, such as client 118*a*. The host 122*a*1 connects via firm network 126*a* with the client 118*a* to host a teleconference. While users may communicate directly using their communicators, communications in the face to face meeting may be held between the attendees by passing communications via secured communication links 128*c* through the firm network 126*a*.

Once the meeting is established between the selected participants, the host and/or participants may identify client information associated with the meeting, such as client number, matter, number, purpose, etc. Information concerning the face to face meeting, such as start time, end time, duration, etc., may be captured using, for example, clock 372*e* (FIG. 3). The input and/or captured information may be stored in the mobile unit 140 (e.g., in database 262*a* of FIGS. 2,3) and/or passed to the manager 114*a*.

The captured activity information may be correlated to the client information by locally and/or remotely processing such information. Information collected may include, for example, location, client, matter, start time, end time, time spent, duration, user notes, meeting notes, attendees, subject, within range, host/attendee status, etc. For example, the amount of time spent by each worker may be stored individually and/or in combination and associated with the client information input into in the mobile memory and/or the firm information. Various combinations of the collected information may be generated to provide desired results. The collected information may be stored in one or more of the user databases 262*a-c*. For example, time, client, subject may be stored in client database 262*a*, and location and range within the phone database 262*c*.

The information may be processed, for example, to calculate the amount of time spent for a client, or the total time worked by a user. The gathered information may be processed to generate desired outputs. For example, processing may capture the total time spent in the meeting, the fee rate associated with the meeting for each individual, and the client information. Processing may also calculate the total fees due for the meeting and/or other captured activities.

Information, such as user total time worked, may be stored and processed locally, and displayed on log 375 for review by the user. The information may be passed to another user, such as the manager 114*a*, to calculate total work for individual clients by one or more users. The work performed by a client may be collected for reporting out an invoice using the reporter 376. In some cases, the manager may adjust the amounts (e.g., by discounting) to generate an invoice including modified amounts.

Security Structure

Figure 5:
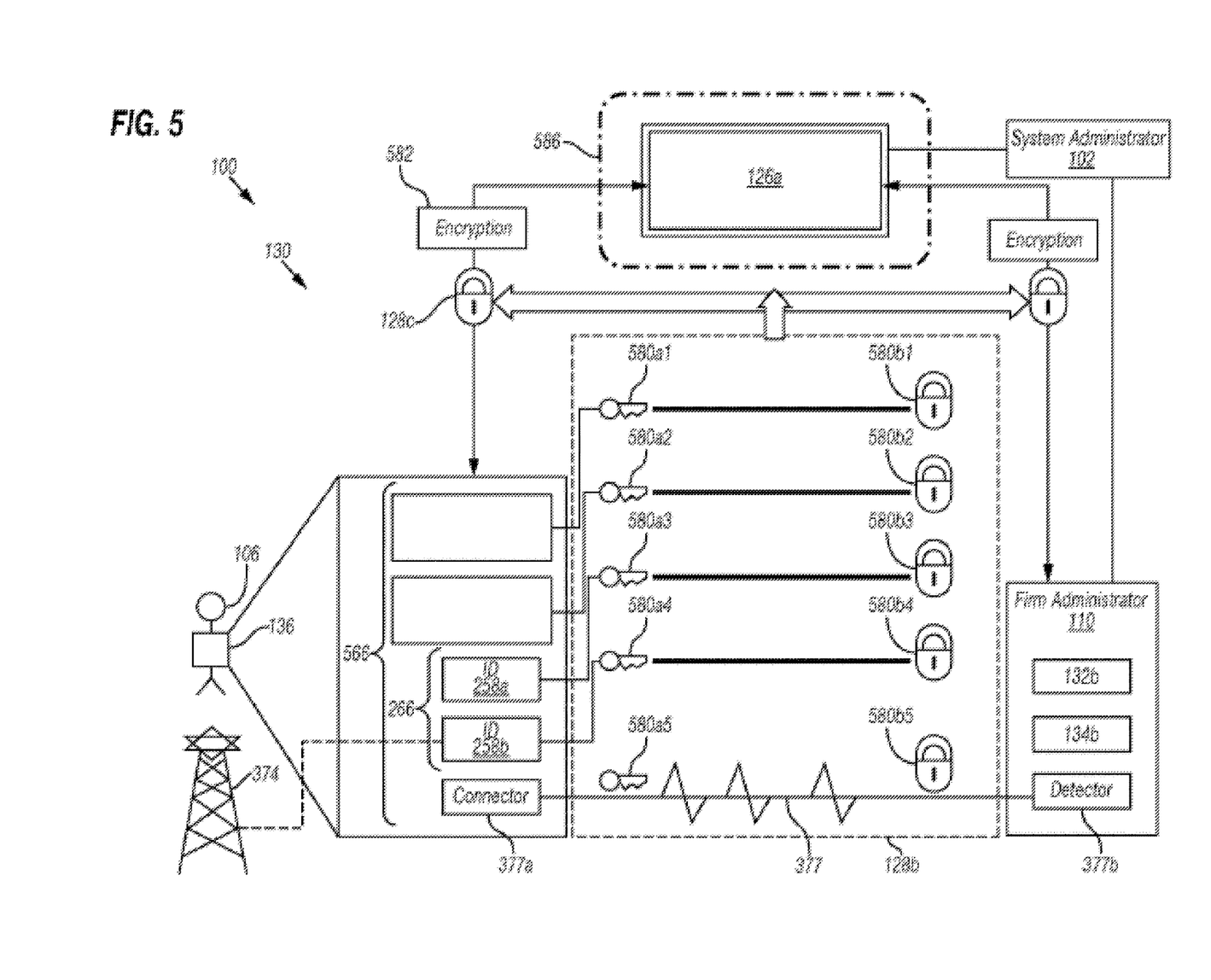
FIG. 5 is a schematic diagram of the integrated activity management system depicting security.

FIG. 5 is a schematic diagram depicting the layered security 130 of the integrated system 100. As shown in this view, the users 106 are provided with access to the firm network 126*a* via the layered security 130. The layered security system provides security access based on a combination of hardware (e.g., SIM card, carrier ID, and phone ID), software (e.g., passwords), location (e.g., coordinates, distance from base, etc.), and/or other user information.

As shown, the security 130 provides multiple keys 580*a*1-*a*5 to the communicator 136 (e.g., mobile unit 140 and/or base unit 138) and corresponding locks 580*b*1-*b*5 of the firm administrator 110. The multiple keys 580*a*1-*a*5 must be matched to corresponding locks 580*b*1-*b*5 in order to unlock the access link 128*b* to the firm administrator 110, and thereby the communication link 128*c* between the users 106 and the firm network 126*a* to allow communication therewith.

The keys 580*a*1-*a*5 may include a variety of identifiers 566 that may be used to confirm the identity of the user 106. For example, the keys 580*a*1-*a*5 may include user defined passwords 580*a*1, *a*2 (e.g., a software password used to log into the communicator 136, a login password assigned by the system administrator 102, etc.), a hardware identifier 580*a*3,*a*4 (e.g., identifier 266, the SIM card 268*a*, the unique phone identification 268*b*, etc.), and/or a location identifier 580*a*5. The location identifier 580*a*5 may be, for example, an expected location of the communicator 136 as determined, for example, by detection by the cellular tower 374 or by a detector 377*b* connected via connection 377 (e.g., a Bluetooth, wifi, or other connection) to connector 377*a* thereby establishing a connection signal between the mobile unit 140 and the firm administrator 110.

The firm database 134*b* may contain identification information of the user 106 that may be used as the locks 580*b*1-*b*5 for matching with the keys 580*a*1-*a*5. The firm processor 132*b* may be used to compare the identification keys 581*a*1-*a*5 of the user 106 with the identification locks 581*b*1-*b*5 of the firm database 134*b* of the firm administrator 110 to confirm a match exists. Once a match is provided, the firm administrator 110 may establish the connection 128c between the user 106 and the firm network 126a.

Each user 106 may communicate with other users of the firm 108a through the firm network 126a. The layered security 130 may assure all connections with other users is provided with added protection. Communications passing to and from the network may be encrypted by an encryptor 582 using a format provided by the system administrator 102, thereby further reducing the possibility of unauthorized access. Additional security, such as a firewall 586, may be provided around the firm network 126 for even more security.

Architecture and Hardware

Figure 6A:
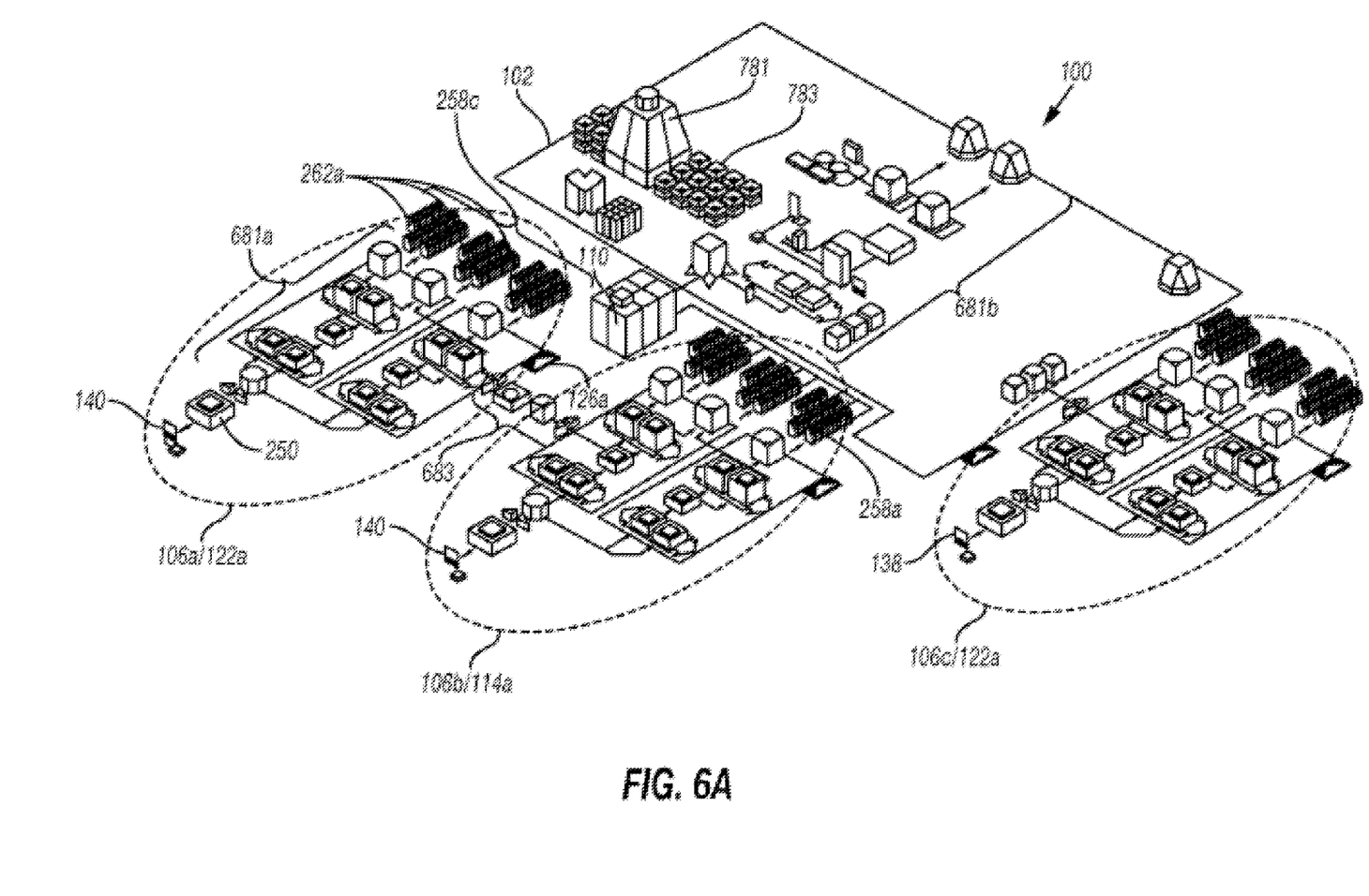
FIGS. 6A and 6B are schematic diagrams depicting architecture of portions of the integrated activity management system.
Figure 6B:
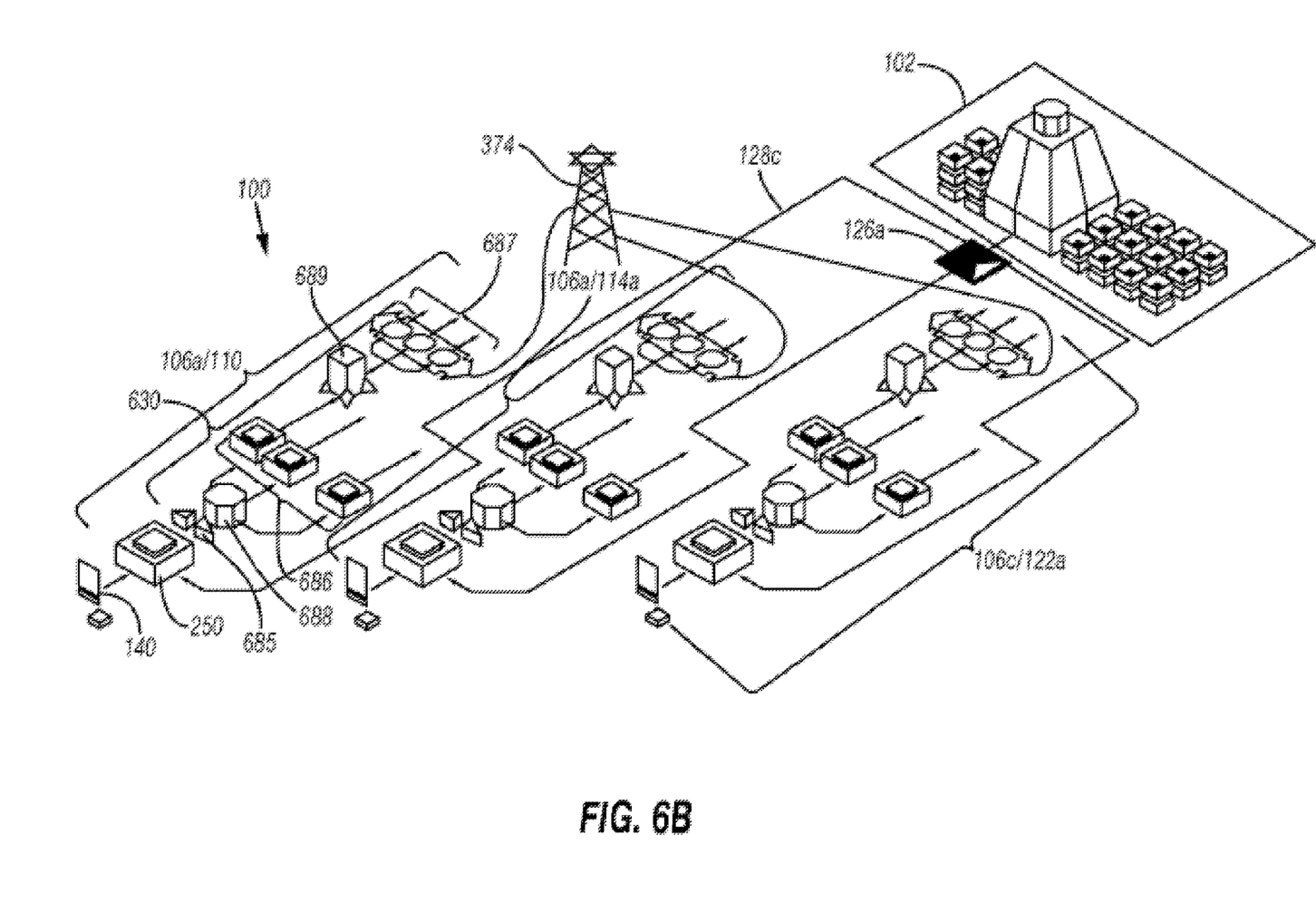

FIGS. 6A and 6B provide additional views of the integrated system 100 depicting architecture thereof. As shown in these view, multiple users 106a-c are coupled to the firm network 126a via communication links 128c. The users 106a may include workers 122a, a manager 114a, a client 118a, and/or other user 106. In the example shown in FIG. 6A, the users 106a-c are workers 122a and a manager 114a, and in the example shown in FIG. 6B, the user 106a is the firm administrator 110, 106b is the manager 114a, and the user 106c is the worker 122a, but any arrangement may be provided (see, e.g., FIG. 1).

As shown in FIG. 6A, the system administrator 102 is communicating with the base unit (e.g., a desktop) 138 and a mobile unit 140 of the worker 122a, and a mobile unit 140 of the manager 114a. Each mobile and base unit has the processor 250, a logic 681a, and the memory 258a,c. The processor 250 defines the logic for accessing functions of each unit and/or for capturing information in the memory 246a,b (see, e.g., FIG. 1).

The users 106a and 106b are coupled to each other via the firm network 126a. The system administrator 102 has logic 681b to control access to the firm network 126a. The system administrator 102 provides access to the firm administrator 110, and the firm administrator 110 grants access to the users 106. The logic 681a of the users 106a-c may be defined according to the logic of the system administrator 102.

The logic 681a,b may be defined to operate in a predefined manner to selectively permit operation of the system 100. As shown, for example, in FIG. 7A, the logic 681a,b may have a sequential (or hierarchical) structure 781a with inputs A, B, C, D that flows through nodes X, Y, Z. In this structure, the logic may progress from an input A to node X, which then determines the next output B which is used as an input to node Y. Input B is reliant on the of output X in order to generate the next output C. In the event that the input B and/or output Y fail to meet certain criteria, then the sequence is broken and terminates operation. Examples of sequential logic are provided in U.S. Pat. Nos. 4,845,633 and 7,835,899 and PCT Application No. WO2013089698, the entire contents of which are hereby incorporated by reference herein.

Figure 7A:
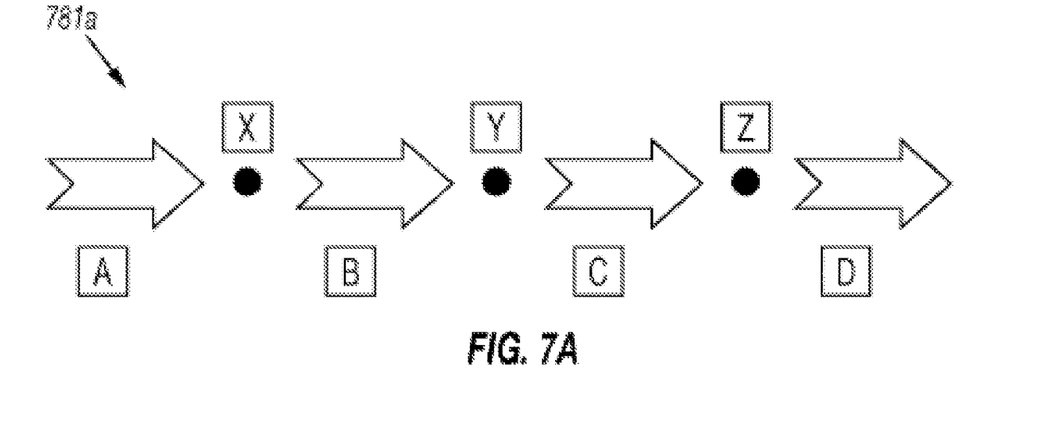
FIGS. 7A and 7B are schematic diagrams of sequential and combination logic of the integrated activity management system.
Figure 7B:
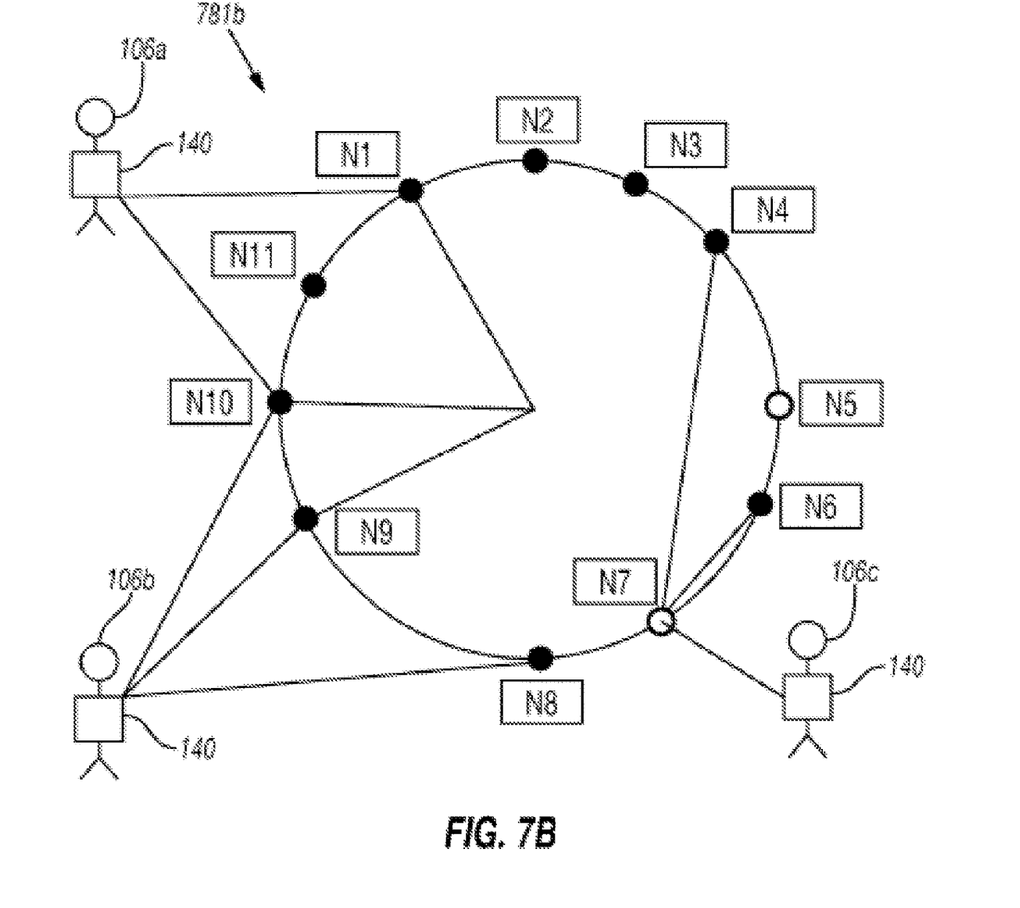

FIG. 7B shows an alternate, integrated structure 781b for logic. The integrated structure 781b provides a flexible, interlocking node structure that permits the user to select any nodes N1-N11 within the node structure for use as needed. The node structure 781b may also adjust to modify existing nodes and/or to expand to include additional nodes as needed.

In this structure, the mobile units 140 of each user 106 may select which nodes N1-N11 to access based on specific needs. The users 106a-c may perform a given activity using their mobile units 140 which then selects which node(s) N1-N11 is/are needed to support the activity. For example, to perform the face to face meeting as shown in FIG. 4, the mobile unit 140 may need to access pre-existing nodes N8 for location, N9 for clock, and N10 for meeting functions, such as invitation/access.

In some cases, existing nodes may be combined to within the node structure to define the nodes for use by the user. For example, user 106 accesses nodes N1 and N10 relating to travel and maps, respectively, which interact within the node system with node N9 relating to mileage to enable nodes N1 and N10 to use the mileage in calculating maps, routing information, and selected transportation for use by user 106. In other cases, new nodes, such as nodes N5 and N7, may optionally be added. For example, upon a request for performing an activity in a new app, such as playing music at a meeting, node N5 may be created in the structure 781b in response to the request of the user 106. In another example, new node N7 for providing call logs may be created based on existing node N4 relating to placing calls and node N6 relating to contacts.

While FIGS. 7A and 7B depict example logic that may be used, other logic, such as combinational, synchronous, asynchronous, application-specific, and/other logic may be provided.

Referring back to FIG. 6A, the logic 681a may provide for decisions concerning where to store and how to process data. The system administrator 102 is provided with the logic structure 781 with nodes 783 (which may similar to those of FIGS. 7A and 7B). The logic 681a as shown is cloned to provide for multiple uses of the data. The data may be stored in memory 246 and assigned to databases 262a-c as described herein. Communication units 683 may be provided to enable communication via detectors, such as Bluetooth, wifi, and cellular towers. The logic 681b may be provided to selectively process and store information provided from the various users.

In the example of FIG. 6B, each user 106a-c has a mobile unit 140 coupled to the firm network 126a via the communication links 128c. Each mobile unit 140 includes a processor 250 in communication with the firm network 126a and mobile security 630. The mobile security 630 includes passwords 685 (e.g., to access the phone and/or software), user identification 686 (e.g., carrier identification, communicator identification, and/or location), and user locators 687 (e.g., wifi, Bluetooth, and cellular tower 374).

The processor 250 defines the operating parameters of the mobile security such that when passwords are entered into the mobile unit 140 they must match password criteria 685 defined by processor 250. If met, divider 688 then selects one or more of the identification 686 for verification. For example, the user's carrier and/or communicator identification may be verified. In another example, the distance of the user from a firm location may be confirmed. In yet another example, the location of the user 106 may be determined using logic 689 to determine location of the user using the locators 687 (e.g., Bluetooth, wifi, or tower 374). Information generated by the processors 250 may be further processed with another user, such as manager 114a and system administrator 102. The information may then be reported out in the form of an invoice as described herein.

Example Operation

Figure 8A:
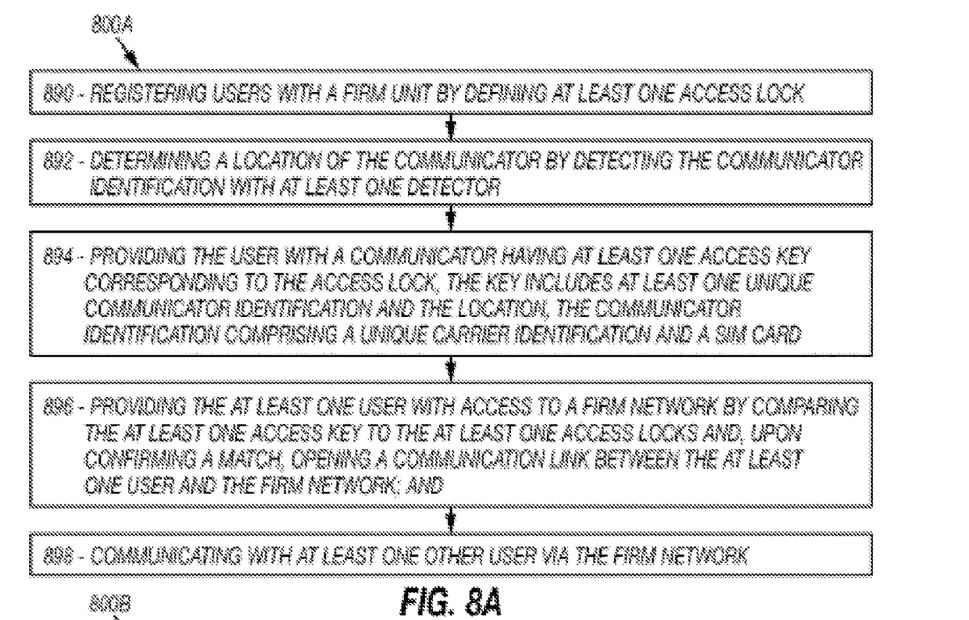
FIGS. 8A and 8B are flow charts illustrating methods for managing activities of a firm.
Figure 8B:
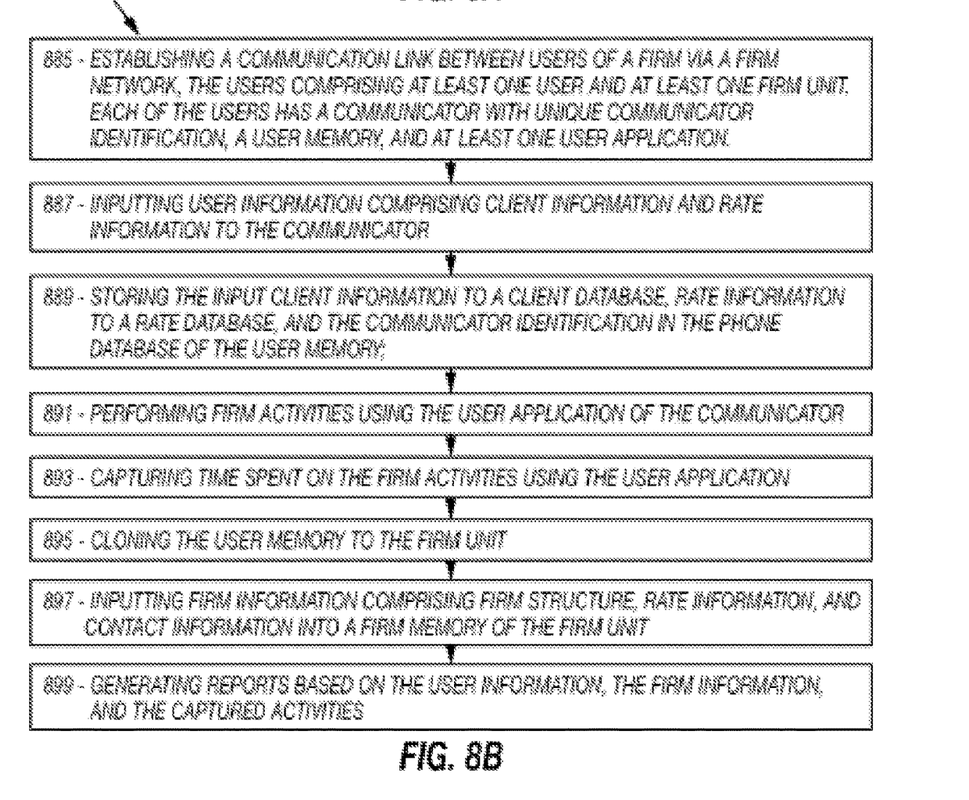

FIGS. 8A and 8B are flow charts illustrating methods 800a,b usable with the integrated activity management system 100. Method 800a is a method for providing secured communication to workers of a firm. Method 800b is a method for managing activities of the firm.

Method 800a involves 890 registering at least one user with a firm unit by defining at least one access lock, 892 determining a location of the communicator by detecting the communicator identification with at least one detector, 894 providing the user with a communicator having at least one access key corresponding to the access lock (the access key comprising at least one unique communicator identification and the location, and the communicator identification comprising a unique carrier identification and a SIM card), 896 providing the user with access to a firm network by comparing the access key to the access locks and, upon confirming a match, opening a communication link between the user and the firm network, and 898 communicating with at least one other user via the firm network.

The method 800b involves 885 establishing a communication link between users of a firm via a firm network. The users include at least one user and at least one firm unit. Each of the users has a communicator with unique communicator identification, a user memory, and at least one user application. The method further involves 887 inputting user information comprising client information and rate information to the communicator, 889 storing the input client information to a client database, rate information to a rate database, and the communicator identification in the phone database of the user memory, 891 performing firm activities using the user application of the communicator, 893 capturing time spent on the firm activities using the user application, 895 cloning the user memory to the firm unit, 897 inputting firm information comprising firm structure, rate information, and contact information into a firm memory of the firm unit, and 899 generating reports based on the user information, the firm information, and the captured activities.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features herein may be provided about for one or more users, firms, administrators, workers, and/or managers.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A method of providing secure communication between users of a network using layered security, the method comprising:
    providing a communicator to each user of a network, each user having user information including user hardware, user software, and user location stored within the network;
    providing multiple keys to each communicator and corresponding locks to the network, each key including a plurality of identifiers to confirm identity of the user;
    verifying that a user seeking to obtain access to the network has a communicator with keys that match all the locks stored on the network; and
    providing the user access to the network when the keys on the communicator are verified,
    wherein the plurality of identifiers is a combination of user hardware, user software, and user location.

2. The method of claim 1, wherein the communicator includes at least one of a phone, a tablet, and a computer.

3. The method of claim 1, wherein the user hardware includes at least one of a subscriber identity module (SIM) card, a carrier identifier (ID), and a unique phone identification.

4. The method of claim 3, wherein the user software includes a user defined password.

5. The method of claim 4, wherein the user defined password is used to log into the communicator of the user.

6. The method of claim 4, wherein the user location includes at least one of coordinates, distance to a predetermined position, and an expected location of the communicator.

7. The method of claim 6, wherein the expected location of the communicator is determined based on a detection of the communicator by a cellular tower.

8. The method of claim 6, wherein the expected location of the communicator is determined based on a detection of the communicator by a detector of the network.

9. The method of claim 1, further comprising enabling the user to securely communicate with the network.

10. The method of claim 9, further comprising using the network to capture user activities from the communicator in real time.

11. The method of claim 10, further comprising encrypting each of the user activities passing to and from the network using an encryptor.

12. The method of claim 11, wherein the user activities include one of global positioning system (GPS), clock, phone, email, calendar, task, text functions, face-to-face meeting, and dashboard.

* * * * *